United States Patent
Kulkarni et al.

(10) Patent No.: US 10,685,070 B2
(45) Date of Patent: Jun. 16, 2020

(54) DYNAMIC CREATIVE OPTIMIZATION FOR EFFECTIVELY DELIVERING CONTENT

(71) Applicant: Facebook, Inc., Menlo Park, CA (US)

(72) Inventors: Aditya Pradip Kulkarni, Sunnyvale, CA (US); Avi Samuel Gavlovski, Kirkland, WA (US); Zhurun Zhang, Bellevue, WA (US); George Xiangwen Zeng, San Francisco, CA (US)

(73) Assignee: FACEBOOK, INC., Menlo Park, CA (US)

( * ) Notice: Subject to any disclaimer, the term of this patent is extended or adjusted under 35 U.S.C. 154(b) by 350 days.

(21) Appl. No.: 15/199,386

(22) Filed: Jun. 30, 2016

(65) Prior Publication Data
US 2018/0004847 A1 Jan. 4, 2018

(51) Int. Cl.
*G06F 16/00* (2019.01)
*G06N 20/00* (2019.01)
(Continued)

(52) U.S. Cl.
CPC .... *G06F 16/9535* (2019.01); *G06F 16/24578* (2019.01); *G06F 16/40* (2019.01);
(Continued)

(58) Field of Classification Search
CPC .......... G06F 17/30017; G06F 17/3074; G06F 17/30781; G06F 17/30244;
(Continued)

(56) References Cited

U.S. PATENT DOCUMENTS 7,882,045 B1 2/2011 Cole et al.
8,131,786 B1 * 3/2012 Bengio ............ G06F 17/30244
707/732
(Continued)

FOREIGN PATENT DOCUMENTS

JP 2014-215685 A 11/2014
WO WO 2005/045607 A2 5/2005
(Continued)

OTHER PUBLICATIONS

International Search Report and Written Opinion, PCT Application No. PCT/US2017/037776, dated Sep. 25, 2017, 12 pages.
United States Office Action, U.S. Appl. No. 15/397,549, dated Mar. 29, 2019, 15 pages.
(Continued)

*Primary Examiner* — Srirama Channavajjala
(74) *Attorney, Agent, or Firm* — BakerHostetler LLP

(57) ABSTRACT

An online system generates dynamically optimized sponsored content for a target user of the online system. Each sponsored content item comprises optimal creatives selected for a target user from a set of creatives provided by a content provider. Each type of creative (e.g. title, image, video, descriptive text), has a trained creative model to generate a prediction score for a creative of the same type based on the features of the creative and the characteristics of the target user. The prediction score of a creative indicates the likelihood that the target user will interact with a sponsored content item that includes that particular creative. The online system selects a creative for each type and assembles the selected creatives into a sponsored content item for the target user. For a different user, a different sponsored content item having different creatives chosen from the same set of creatives is generated.

18 Claims, 4 Drawing Sheets

(51) Int. Cl.

| | | |
|---|---|---|
| *G06F 16/9535* | (2019.01) | |
| *G06F 16/2457* | (2019.01) | |
| *G06Q 30/02* | (2012.01) | |
| *G06Q 10/10* | (2012.01) | |
| *G06F 16/583* | (2019.01) | |
| *G06F 16/58* | (2019.01) | |
| *G06F 16/40* | (2019.01) | |
| *G06F 16/50* | (2019.01) | |
| *G06N 7/00* | (2006.01) | |

(52) U.S. Cl.
CPC ............ *G06F 16/50* (2019.01); *G06F 16/583* (2019.01); *G06F 16/5866* (2019.01); *G06N 7/005* (2013.01); *G06N 20/00* (2019.01); *G06Q 10/10* (2013.01); *G06Q 30/0241* (2013.01)

(58) Field of Classification Search
CPC ......... G06F 17/30286; G06F 17/30749; G06F 17/30867; G06F 17/3053; G06F 17/30784; G06F 17/30253; G06F 17/30864; G06F 16/24578; G06F 16/2465; G06F 16/337; G06F 16/95; G06F 16/9536; G06F 16/583; G06F 16/951; G06F 16/6265; G06F 16/9535; G06F 16/5866; G06F 16/40; G06F 16/50; G06N 20/00; G06N 7/005; G06K 9/0014; G06K 9/00711; G06Q 30/0241; G06Q 10/10
See application file for complete search history.

(56) References Cited

U.S. PATENT DOCUMENTS

| | | |
|---|---|---|
| 8,401,899 B1 | 3/2013 | Kauchak et al. |
| 8,738,436 B2* | 5/2014 | Tuladhar ............... G06Q 10/04 705/14.4 |
| 8,862,741 B1* | 10/2014 | Tegtmeier ............. H04L 41/145 709/220 |
| 9,135,292 B1 | 9/2015 | Tsun et al. |
| 9,317,812 B2* | 4/2016 | Kabiljo ................... G06Q 30/02 |
| 9,449,109 B1 | 9/2016 | Keel et al. |
| 9,536,011 B1 | 1/2017 | Kirillov |
| 9,760,910 B1 | 9/2017 | Tuchman et al. |
| 10,387,902 B1 | 8/2019 | Ayars et al. |
| 10,423,977 B1 | 9/2019 | Ayars et al. |
| 2002/0194215 A1 | 12/2002 | Cantrell et al. |
| 2003/0076350 A1 | 4/2003 | Vu |
| 2003/0105589 A1* | 6/2003 | Liu ........................... G06F 16/40 702/1 |
| 2003/0191816 A1 | 10/2003 | Landress et al. |
| 2004/0030726 A1 | 2/2004 | Baxter et al. |
| 2004/0111432 A1* | 6/2004 | Adams, Jr. ........ G06F 17/30256 |
| 2004/0117367 A1* | 6/2004 | Smith ............... G06F 17/30265 |
| 2004/0255245 A1 | 12/2004 | Yamada et al. |
| 2005/0251532 A1* | 11/2005 | Radhakrishnan ........................... G06F 17/30787 |
| 2006/0200761 A1 | 9/2006 | Judd et al. |
| 2007/0022003 A1 | 1/2007 | Chao et al. |
| 2007/0027901 A1 | 2/2007 | Chan et al. |
| 2007/0050253 A1 | 3/2007 | Biggs et al. |
| 2007/0050372 A1 | 3/2007 | Boyle |
| 2007/0156514 A1 | 7/2007 | Wright et al. |
| 2007/0156621 A1 | 7/2007 | Wright et al. |
| 2007/0260520 A1 | 11/2007 | Jha et al. |
| 2008/0005683 A1 | 1/2008 | Aoki |
| 2008/0037877 A1* | 2/2008 | Jia ........................ G06F 16/583 382/224 |
| 2008/0052140 A1 | 2/2008 | Neal et al. |
| 2008/0059312 A1 | 3/2008 | Gem et al. |
| 2008/0086686 A1* | 4/2008 | Jing ..................... G01C 21/3605 715/706 |
| 2008/0117448 A1 | 5/2008 | Ijams et al. |
| 2008/0184287 A1 | 7/2008 | Lipscomb |
| 2008/0249855 A1 | 10/2008 | Collins et al. |
| 2009/0055725 A1 | 2/2009 | Portnoy et al. |
| 2009/0187477 A1 | 7/2009 | Bardin et al. |
| 2009/0265243 A1 | 10/2009 | Karassner et al. |
| 2010/0083129 A1 | 4/2010 | Mishra et al. |
| 2010/0100442 A1 | 4/2010 | Gorsline et al. |
| 2010/0211621 A1 | 8/2010 | Hariharan et al. |
| 2010/0268609 A1 | 10/2010 | Nolet et al. |
| 2010/0324997 A1 | 12/2010 | Evans |
| 2011/0015988 A1 | 1/2011 | Wright et al. |
| 2011/0016408 A1 | 1/2011 | Grosz et al. |
| 2011/0055025 A1 | 3/2011 | Krol |
| 2011/0202424 A1 | 8/2011 | Chun et al. |
| 2011/0321003 A1 | 12/2011 | Doig et al. |
| 2012/0011003 A1 | 1/2012 | Ketchum et al. |
| 2012/0030014 A1 | 2/2012 | Brunsman et al. |
| 2012/0054130 A1* | 3/2012 | Mensink ............. G06F 17/30722 706/12 |
| 2012/0072272 A1 | 3/2012 | Kilar et al. |
| 2012/0072286 A1 | 3/2012 | Kilar et al. |
| 2012/0078961 A1 | 3/2012 | Goenka |
| 2012/0191548 A1 | 7/2012 | Des Jardins et al. |
| 2012/0291057 A1 | 11/2012 | Gunda et al. |
| 2013/0013425 A1 | 1/2013 | Spehr et al. |
| 2013/0103692 A1* | 4/2013 | Raza ....................... G06Q 50/01 707/741 |
| 2013/0117107 A1 | 5/2013 | Evans |
| 2013/0132311 A1* | 5/2013 | Liu ....................... G06N 99/005 706/12 |
| 2013/0198636 A1 | 8/2013 | Kief et al. |
| 2013/0204825 A1* | 8/2013 | Su ............................. G06N 5/04 706/46 |
| 2013/0251248 A1* | 9/2013 | Guo ........................ G06F 17/10 382/159 |
| 2013/0339155 A1 | 12/2013 | Yerli |
| 2014/0108145 A1 | 4/2014 | Patel et al. |
| 2014/0114746 A1 | 4/2014 | Pani et al. |
| 2014/0129490 A1* | 5/2014 | Wu .................... G06F 17/30867 706/12 |
| 2014/0136935 A1 | 5/2014 | Santillie et al. |
| 2014/0156416 A1 | 6/2014 | Goenka et al. |
| 2014/0207585 A1 | 7/2014 | Walke |
| 2014/0214529 A1 | 7/2014 | Gross-Baser et al. |
| 2014/0214790 A1 | 7/2014 | Vaish et al. |
| 2014/0237331 A1 | 8/2014 | Brooks |
| 2014/0278959 A1 | 9/2014 | Nukala et al. |
| 2014/0279016 A1 | 9/2014 | Capel et al. |
| 2014/0281928 A1 | 9/2014 | Tkach et al. |
| 2014/0282076 A1 | 9/2014 | Fischer |
| 2014/0324604 A1 | 10/2014 | Munoz et al. |
| 2015/0073922 A1 | 3/2015 | Epperson et al. |
| 2015/0106178 A1 | 4/2015 | Atazky et al. |
| 2015/0154503 A1* | 6/2015 | Goswami ............... G06Q 30/02 707/722 |
| 2015/0206171 A1 | 7/2015 | Zigoris et al. |
| 2015/0213514 A1 | 7/2015 | Doig et al. |
| 2015/0234542 A1 | 8/2015 | Kirillov |
| 2015/0248423 A1 | 9/2015 | Christolini et al. |
| 2015/0248484 A1 | 9/2015 | Yu et al. |
| 2015/0332313 A1 | 11/2015 | Slotwiner et al. |
| 2015/0379557 A1 | 12/2015 | Liu et al. |
| 2016/0019243 A1 | 1/2016 | Kamel et al. |
| 2016/0042409 A1 | 2/2016 | Gyllenberg |
| 2016/0092405 A1 | 3/2016 | Lee et al. |
| 2016/0092935 A1 | 3/2016 | Bradley et al. |
| 2016/0147758 A1* | 5/2016 | Chhaya ............... G06F 16/9535 707/733 |
| 2016/0212500 A1 | 7/2016 | Makhlouf |
| 2016/0307228 A1 | 10/2016 | Balasubramanian et al. |
| 2016/0307229 A1 | 10/2016 | Balasubramanian et al. |
| 2016/0307237 A1 | 10/2016 | Glover et al. |
| 2016/0328789 A1 | 11/2016 | Grosz et al. |
| 2016/0334240 A1 | 11/2016 | Arokiaraj et al. |
| 2016/0345076 A1 | 11/2016 | Makhlouf |
| 2016/0357717 A1 | 12/2016 | Metz et al. |
| 2016/0357725 A1 | 12/2016 | Homans et al. |

(56) References Cited

U.S. PATENT DOCUMENTS

| | | |
|---|---|---|
| 2016/0364770 A1 | 12/2016 | Denton et al. |
| 2016/0371230 A1 | 12/2016 | Kirillov et al. |
| 2016/0371231 A1 | 12/2016 | Kirillov et al. |
| 2017/0068996 A1 | 3/2017 | Qin |
| 2017/0161794 A1 | 6/2017 | Zhu et al. |
| 2017/0178187 A1 | 6/2017 | Santi et al. |
| 2017/0220694 A1 | 8/2017 | Vaish et al. |
| 2017/0270083 A1 | 9/2017 | Pruitt et al. |
| 2018/0025470 A1 | 1/2018 | Wang |
| 2018/0040029 A1* | 2/2018 | Zeng .................. G06Q 30/0269 |
| 2018/0060921 A1 | 3/2018 | Mengle et al. |
| 2018/0158094 A1 | 6/2018 | Chitilian et al. |
| 2018/0189074 A1 | 7/2018 | Kulkarni et al. |
| 2018/0189822 A1 | 7/2018 | Kulkarni et al. |
| 2018/0189843 A1* | 7/2018 | Kulkarni ............ G06Q 30/0276 |
| 2018/0300745 A1 | 10/2018 | Aubespin et al. |
| 2018/0365707 A1 | 12/2018 | Jha et al. |

FOREIGN PATENT DOCUMENTS

| | | |
|---|---|---|
| WO | WO 2005-125201 A1 | 12/2005 |
| WO | WO 2011-009101 A1 | 1/2011 |

OTHER PUBLICATIONS

United States Office Action, U.S. Appl. No. 15/397,556, dated Jan. 24, 2019, 18 pages.
United States Office Action, U.S. Appl. No. 15/397,556, dated Aug. 13, 2018, 21 pages.
United States Office Action, U.S. Appl. No. 15/397,537, dated Apr. 17, 2019, 14 pages.
Schrier, E. et al., "Adaptive Layout for Dynamically Aggregated Documents," *IUI '08*, Jan. 13-16, 2008, Maspalomas, Gran Canaria, fourteen pages.
United States Office Action, U.S. Appl. No. 15/397,537, dated Dec. 30, 2019, 13 pages.

\* cited by examiner

DYNAMIC CREATIVE OPTIMIZATION FOR EFFECTIVELY DELIVERING CONTENT

BACKGROUND

This disclosure generally relates to online content distribution, and more specifically to dynamically creating content items from a set of individual content components for a target audience.

Content providers produce content that is targeted to certain audiences within online systems. Users interact with content received from the online system. With the advent of online systems such as social networking systems, content providers have increasingly relied on the online systems to create effective sponsored content within the online system to greatly increase engagement among users of the online systems. For example, subsequent to presenting sponsored content provided by a content provider to users of an online system, the online system tracks how often the users interact with the presented content and calculates statistics for the content. These statistics may be accrued over numerous content campaigns and serve to measure the effectiveness of each content item in the campaign. Based on these statistics, the content provider can edit content items that perform poorly or alternatively choose to show content items that have performed very effectively.

Currently, content providers face challenges in running content campaigns at scale on an online system such as setting up content campaigns such that the best possible content item is created and delivered to each user of the online system. For example, current solutions only enable a content provider to present pre-assembled content items to users of an online system. Online systems can track the performance of pre-assembled content items but provide zero or very little feedback to content providers about the performance of particular components (e.g., text, images and videos) of a content item. Content providers cannot "see inside a content item" to understand which components of the content item did not perform well for their objectives or target audience.

SUMMARY

An online system, such as a social networking system, presents dynamically optimized content to users of the online system. Each sponsored content (also referred to as "content" or "content item"), has a number of different types of component creatives (also referred to as "creatives"). Examples of different types of creatives include images, videos, bodies of text, call_to_action_types (e.g. install application, play application), titles, descriptions, universal resource locators (URL), and captions. A dynamic creative optimization (DCO) module of the online system receives a number of component creatives from a user of the DCO system, such as a content ad provider, and assembles the creatives into a sponsored content item. The DCO module can also receive, from the content provider, constraints or rules describing how the component creatives should be included in the sponsored content item. For each opportunity to present a sponsored content item to a user (or a target audience that includes the user), the DCO module selects an optimal creative for each type of creative. For example, the optimal image creative is selected from multiple image creative candidates. The selection occurs based on a component model trained to dynamically optimize component creatives of that type. The DCO module assembles the selected creatives into a sponsored content, which represents the optimal assembly of component creatives for the user (or for the audience that includes the user). Each user of the online system is presented with a sponsored content item having a number of component creatives, which are dynamically selected based on the user's information and information describing the component creatives. Different users of the online system are provided with different sponsored content composed of different component creatives, each component creative optimally selected for that audience or that user.

The figures depict various embodiments for purposes of illustration only. One skilled in the art will readily recognize from the following discussion that alternative embodiments of the structures and methods illustrated herein may be employed without departing from the principles of the invention described herein.

DETAILED DESCRIPTION

Overview of System Environment

Figure 1:
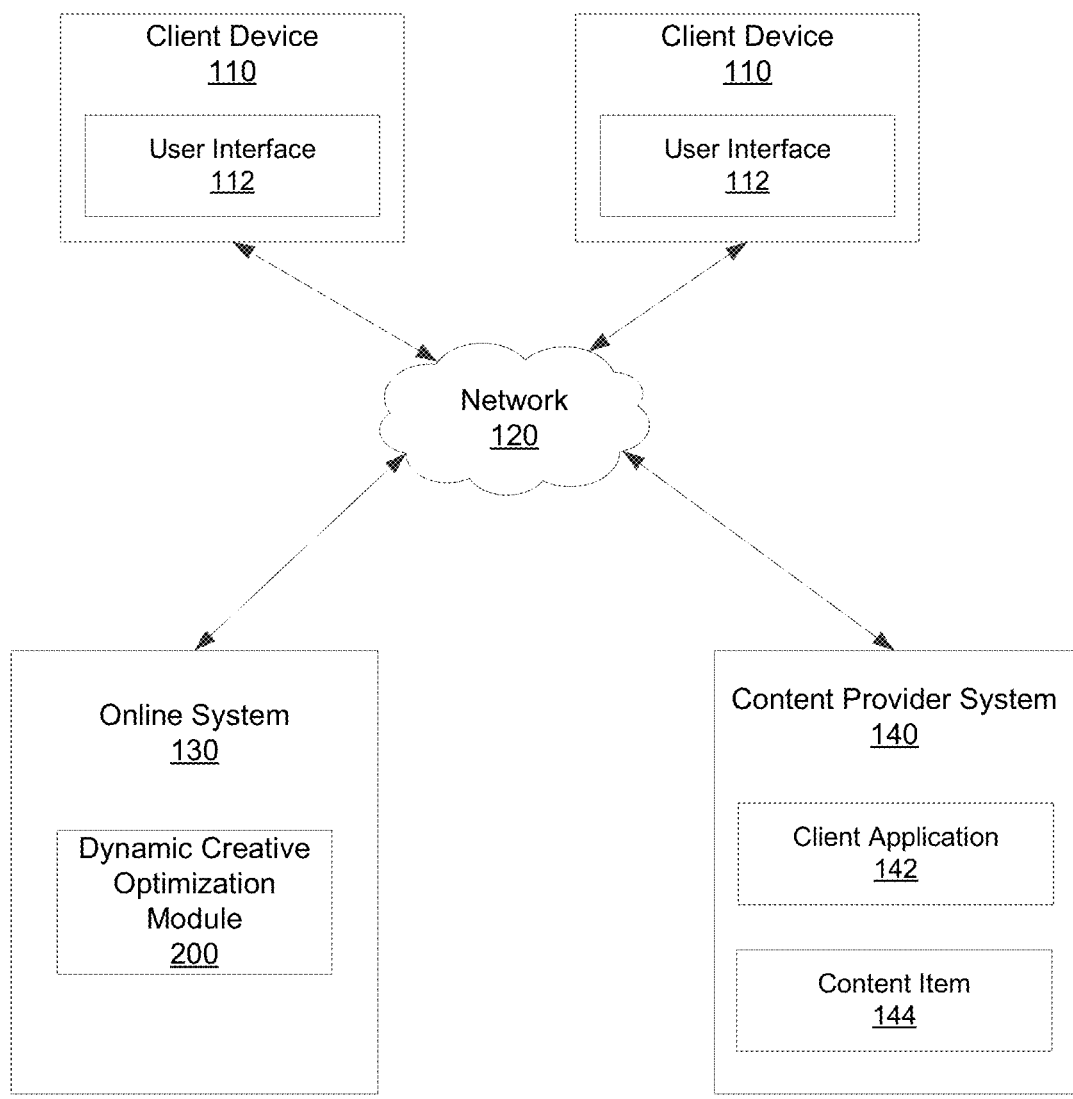
FIG. 1 is a system environment of an online system including a dynamic creative optimization module in accordance with an embodiment of the invention.

FIG. 1 is an illustration of one embodiment of a system environment 100 including a dynamic creative optimization (DCO) module 200 for dynamically creating content items from a set of individual component creatives for a target audience. As shown in FIG. 1, the system environment 100 includes one or more client devices 110, a content provider system 140, and an online system 130 connected through a network 120. While FIG. 1 shows two client devices 110 for simplicity, each with a user interface 112 that a user can provide input to one online system 130, and one content provider system 140, it should be appreciated that any number of these entities (including millions) may be included. In alternative configurations, different and/or additional entities may also be included in the system environment 100.

A client device 110 is a computing device capable of receiving user input through a user interface 112, as well as transmitting and/or receiving data via the network 120. Examples of client devices 110 include desktop computers, laptop computers, tablet computers (pads), mobile phones, personal digital assistants (PDAs), gaming devices, or any other electronic device including computing functionality and data communication capabilities. A user of the client device 110 accesses the online system 130 and interacts with content provided by the online system 130 or by the content provider system 140. For example, the user may retrieve the content for viewing and indicate an affinity towards the content by posting comments about the content or recommending the content to other users. Alternatively a user may indicate a dislike towards the content by flagging the content or closing or hiding the content window, thereby indicating that the user is not interested in the content.

The network 120 facilitates communications among one or more client devices 110, the online system 130, and/or one or more content provider systems 140. The network 120 may be any wired or wireless local area network (LAN) and/or wide area network (WAN), such as an intranet, an extranet, or the Internet. In various embodiments, the network 120 uses standard communication technologies and/or protocols. Examples of technologies used by the network 120 include Ethernet, 802.11, 3G, 4G, 802.16, or any other suitable communication technology. The network 120 may use wireless, wired, or a combination of wireless and wired communication technologies. Examples of protocols used by the network 120 include transmission control protocol/Internet protocol (TCP/IP), hypertext transport protocol (HTTP), simple mail transfer protocol (SMTP), file transfer protocol (TCP), or any other suitable communication protocol.

The content provider system 140 is used by content providers for interacting with the online system 130. Examples of interactions include providing content, providing components of the content, and providing information related to the content and the components. In the embodiment shown in FIG. 1, the content provider system 140 has a client application 142 and a content item 144. The content provider system 140 interacts with the online system 130 using application programming interfaces (APIs) of the online system 130. The client application 142 allows users associated with content provider system 140 to interact with the online system 130. The client application 142 may present a user interface that is different from the user interface of the client device 110.

The content provider system 140 provides one or more content items 144 and/or component creatives to be included in a content item 144 to the online system 130. A content item 144 may be sponsored content such as advertisements sponsored by advertisers. A content item 144 is a combination of a number of component creatives (also called "creatives"); each component creative is a part of the content item 144 to be presented to a target user and each component creative is of a type. Examples of types of creatives includes image, video, body representing the primary message of the content item, call_to_action_type (e.g., shop_now, learn_more, etc.,), title representing a short headline in the content item, description representing secondary message of the content item, URL, and caption representing corresponding text of an URL. In one embodiment, a content provider system 140 provides a content item 144 having a set of predetermined creatives to the online system 130 for presentation to a target user, e.g., {Image A, Title A, Body B}. In another embodiment, a content provider system 140 provides a set of creatives to the online system 130, which dynamically decides which creative to use in the content item 144 to be delivered to a target user. For example, a content provider system 140 is able to provide a content item 144 in a set having the following different types of creatives:

```
{
    Images: {ImageA, ImageB, ImageC}
    Titles: {TitleA, TitleB, TitleC}
    Body: {BodyA, BodyB, BodyC}
}
```

The online system 130 communicates via the network 120 with the content provider system 140, and/or with one or more client devices 110. In one embodiment, the online system 130 receives a content item 144 having a set of predetermined creatives. In another embodiment, the online system 130 receives a set of creatives from which the content item 144 is dynamically created upon receiving a request for presentation of a content item 144. The online system 130 then delivers the content item 144 to its target audience. For simplicity, the content item 144 having a set of predetermined creatives is referred to as "pre-assembled content item" and the content item 144 to be dynamically assembled is referred to as "DCO content item."

To provide a DCO content item for a target user, the online system 130 applies a trained component model, each component model associated with a particular type of creative in the content item 144, e.g., an image model is applied for image creatives in the content item 144. Each creative is applied to its corresponding trained component model to generate a prediction score that also takes into consideration the target user's information. The online system 130 selects the creative with the highest prediction score from each category of creatives and combines the selected creatives of each type to create the DCO content item for the target user. Therefore, two different audiences are provided with different DCO content items composed of different combinations of creatives. Using the sample example described above, the online system 130 dynamically decides which creatives to use in the content item 144 to delivered to a target user, e.g., for user 1, the content item 144 including {ImageB, TextB and BodyB}; for a different user, e.g., for user 2, the content item 144 including {ImageC, TextA, BodyC}. Dynamically assembling content item is further described with reference to FIG. 2.

Figure 3:
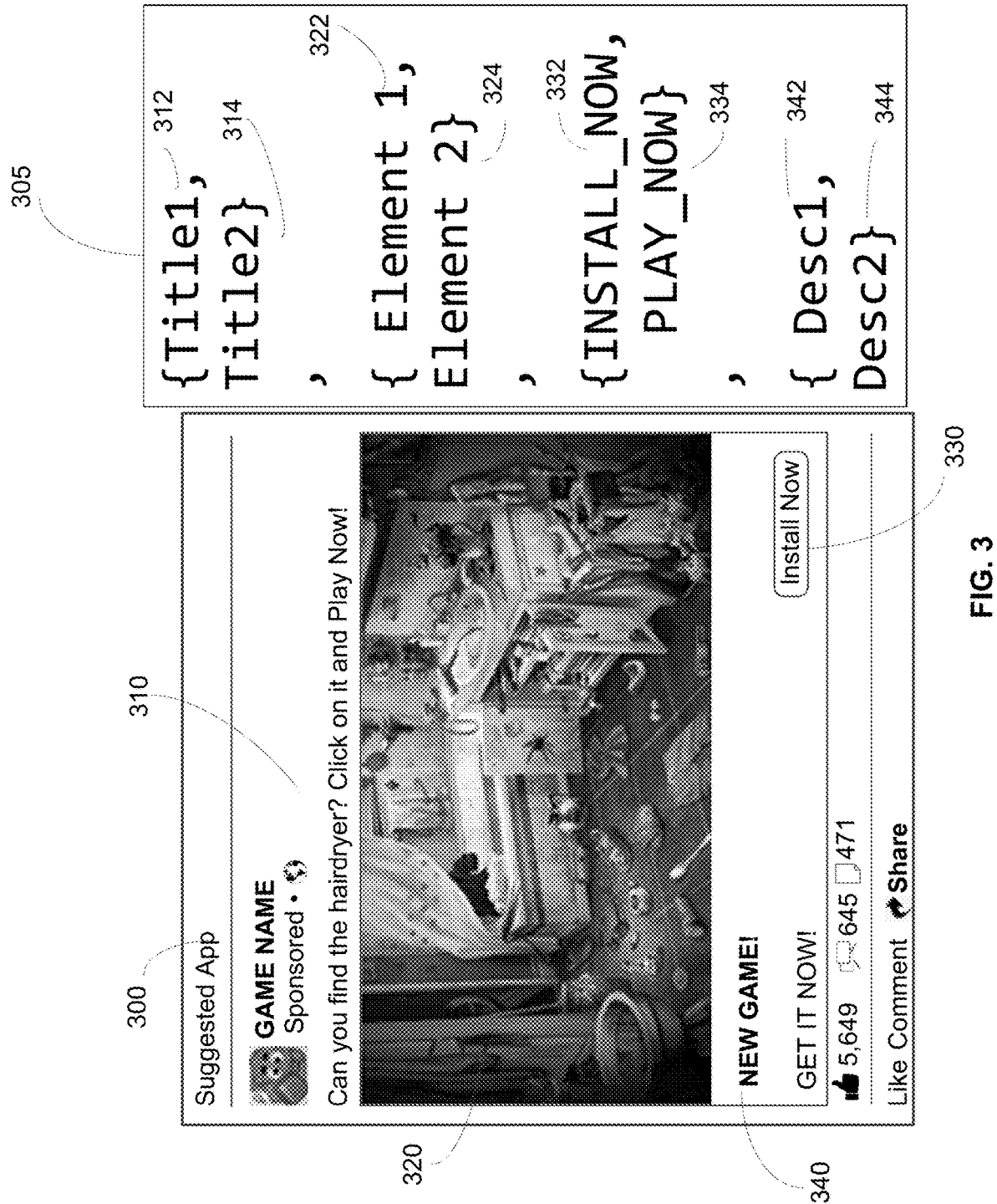
FIG. 3 is an illustration of a content item having multiple creatives selected by the DCO module in accordance with an embodiment of the invention.

Turning now to FIG. 3, FIG. 3 is an illustration of an assembled content item 300 comprising multiple creatives selected by the DCO module 200, in accordance with an embodiment of the invention. A content provider system 140 provides, to the online system 130, a set of creatives 305, including two titles: Title1 312 and Title2 314, two image elements, Element1 322 and Element 2 324, two call_to_action_types: INSTALL_NOW 332 and PLAY_NOW 334, two descriptions: Desc1 342 and Desc2, 344. The online system 130 dynamically decides a creative for each type to be included in the content item 300 for a target user. For example, the online system 130 selects a title 310 (i.e., "Can you find the hairdryer? Click on it and Play Now!") from two title candidates 312 and 314, an image 320 from two image candidates 322 and 324, a call_for_action_type 330 (i.e., "Install Now") from the two call_for_action_type candidates 332 and 334, and a description 340 (i.e., "NEW GAME") from two description candidates 342 and 344.

Turning back to FIG. 1, the online system 130 additionally permits users to establish connections (e.g., friendship type relationships, follower type relationships, etc.) between one another. In one embodiment, the online system 130 stores user accounts and/or user profiles describing the users of the online system 130. User profiles are associated with the user accounts and include information describing the users, such as demographic data (e.g., gender information), biographic data (e.g., interest information), etc. Using information in the user profiles, connections between users, and any other suitable information, the online system 130 maintains a social graph of nodes interconnected by edges. Each node in the social graph represents an object associated with the online system 130 that may act on and/or be acted upon by another object associated with the online system 130. An edge between two nodes in the social graph represents a particular kind of connection between the two nodes. An edge may indicate that a particular user of the online system 130 has shown interest in a particular subject matter associated with a sponsored content. For example, the user profile may be associated with edges that define a user's prior activity that includes, but is not limited to, visits to various web pages, searches for web pages, commenting and sharing web pages, liking content items, commenting on content items, sharing content items, joining groups, attending events, checking-in to locations, and buying products advertised by advertisements presented to the user.

In one embodiment, the online system 130 may use edges to generate stories describing actions performed by users, which are communicated to one or more additional users connected to the users through the online system 130. For example, the online system 130 may present a story to an additional user about a first user (e.g. a friend) that has liked a new game or application advertised by a sponsored content item presented to the first user. The additional user may choose to interact with the presented story thereby creating an edge in the social graph maintained by the online system 130 between the additional user and the subject matter of the story. The online system 130 may store this edge. This edge may be retrieved at a future time point when the online system 130 seeks to identify components that may align well with the additional user's preferences.

In various embodiments, in addition to receiving one or more content items 144 from the content provider system 140, the online system 130 may also receive one or more advertisement requests. In various embodiments, an advertisement request includes a landing page specifying a network address to which a user is directed when the advertisement is accessed. An advertisement request from an advertiser also includes a bid amount associated with an advertisement. The bid amount is used to determine an expected value, such as monetary compensation, provided by an advertiser to the online system 130 if the advertisement is presented to a user, if the advertisement receives a user interaction, or based on any other suitable condition. For example, the bid amount specifies a monetary amount that the online system 130 receives from the advertiser if the advertisement is displayed and the expected value is determined by multiplying the bid amount by a probability of the advertisement being accessed.

Dynamic Creative Optimization (DCO)

Figure 2:
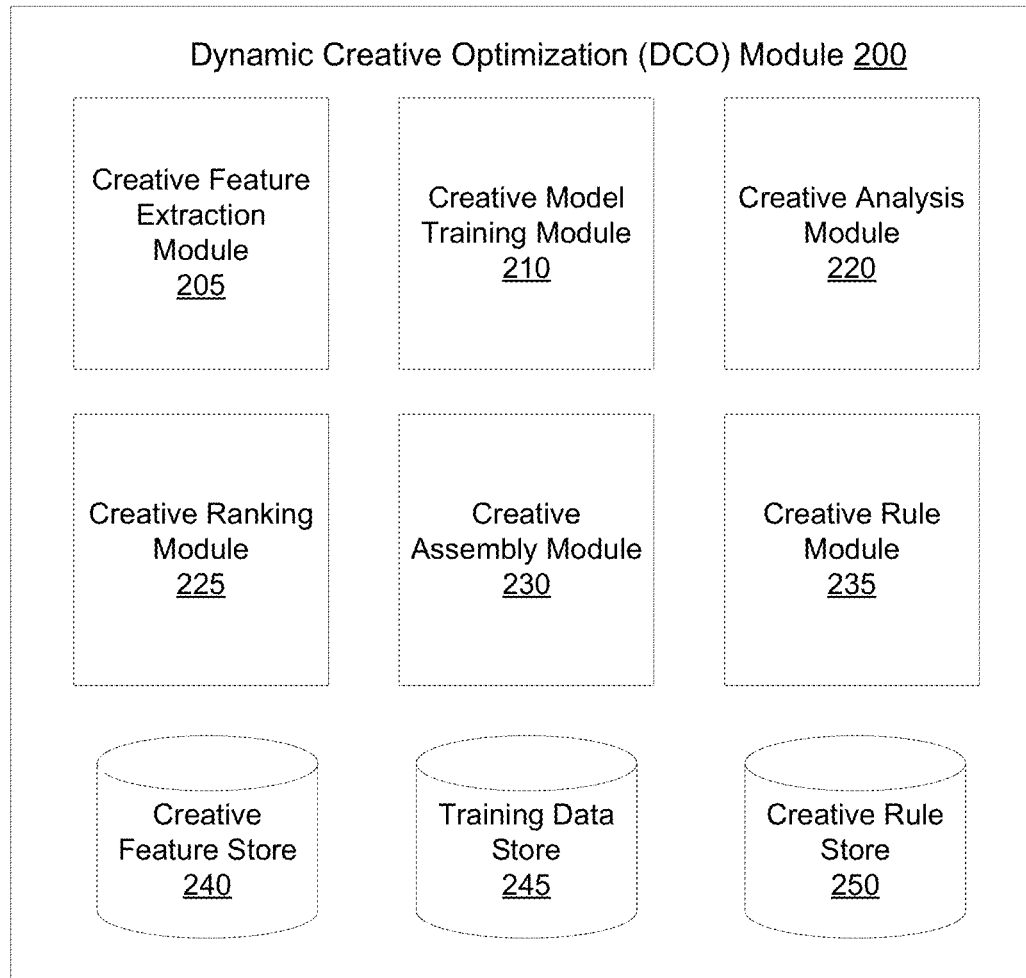
FIG. 2 is a block diagram of a dynamic creative optimization module in accordance with an embodiment of the invention.

In one embodiment, the online system 130 has a dynamic creative optimization module 200 to dynamically select creatives to be included in a content item for a target user. FIG. 2 is a block diagram of the DCO module 200 shown in FIG. 1 in accordance with an embodiment of the invention. The DCO module 200 receives a set of creatives from a content provider such as an advertiser, and dynamically creates a content item for a user (or for a target audience that includes the user). The dynamically created content item includes the optimal combination of creatives selected for the user. If the DCO module 200 is presented to a different audience for the same set of creatives, it may create a different content item composed of optimal creatives selected for that different audience. The DCO module 200 trains a creative model for each type of creative. The trained creative model receives, as inputs, the creative and information regarding the target user (or target audience that includes the audience). The trained creative model generates a prediction score for that creative. The DCO module 200 may further apply a set of rules describing a variety of conditions or constraints when selecting and combining the creatives.

In the embodiment shown in FIG. 2, the DCO module 200 includes a creative feature extraction module 205, a creative model training module 210, a creative analysis module 220, a creative ranking module 225, a creative assembly module 230, a creative rule module 235, a creative feature store 240, a training data store 245, and a creative rule store 250. In alternative configurations, less, different and/or additional entities may also be included in the DCO module 200, e.g., a user feature store for storing feature vectors describing users of the online system 130.

The creative feature extraction module 205 receives creatives of a content item from a content provider through the content provider system 140 and the network 120. The creative feature extraction module 205 extracts features of each creative and stores the extracted creative features in a creative feature vector in the creative feature store 240. In one embodiment, the creative feature extraction module 205 extracts specific features associated with each type of creative. For example, for textual creatives such as description, call_to_action_type, and caption and body text, the creative feature extraction module 205 uses textual analysis methods known to those of ordinary skills in the art to extract individual words and text strings from the creatives. Taking the title text 310 of the content item 300 as illustrated in FIG. 3 as an example, the creative feature extraction module 205 extracts the individual words included in the title text such as "hairdryer" or "Play". Text strings composed of individual words may also be concatenated to produce additional extracted features (e.g. "find hairdryer", "Click Play"). Further extracted features may include font size, font color, and number of words associated with a textual component of the creative.

The creative feature extraction module 205 extracts various image features associated with an image creative such as dominant color of the image, background color of the image, size of the image (e.g., width and length of the image), and a total number of image skin blobs. In one embodiment, the creative feature extraction module 205 uses image processing algorithms such as edge detection, Blob extraction, histogram analysis, pixel intensity filtering, gradient filtering, or scale-invariant feature transform to extract visual features of an image. Alternatively, the creative feature extraction module 205 applies an image feature extraction model to extract visual features of an image, where the extraction model is trained using asynchronous stochastic gradient descent procedure and a variety of distributed batch optimization procedure on computing clusters a large corpus of training images.

In addition to visual images associated with an image creative, the creative feature extraction module 205 may also extract text associated with the image, e.g., textual caption of the image, and other related information, e.g., location of the feature in the image creative. For example, in FIG. 3, the location of the spider at the center of the creative may be stored as a feature. The creative feature extraction module 205 similarly extracts features of other types of components, e.g., videos, by applying suitable feature extraction schemes such as video processing for videos.

The creative model training module 210 continuously trains a creative model for each creative type using the training data stored in the training data store 245. For example, the creative model training module 210 trains an image model for image creatives, a video model for video creatives, a title model for title creatives, a body model for body creatives, a call_for_action_type model for call_for_action_type creatives, and a caption model for caption creatives. Each trained component model is configured to generate a prediction score for each creative candidate to be included in a content item for a target user; in other words, each trained model takes target user information and creative information and generates a score that reflects how likely the target user will click on the content item having the creative. The target user information is represented by multiple user features (e.g., a few thousand features from the user profile and other information associated with the user) such as age, gender, demographic group, socioeconomic status, personal interests, and social connections. The creative information is represented by multiple creative features (e.g., a few hundred features from the creatives) such as image width, height, and image's most frequent pixel value for green component.

For example, a trained image model, ImageModel, is configured to predict how likely a user, User, is to click a content item having an image, ImageA, as follows: ImageModel (ImageA, User)→0.50, where 0.50 is the prediction score. Similarly, the trained image model can be applied to another image, ImageB, to predict how likely User is to click the content item having an ImageB as: ImageModel (ImageB, User)→0.55, where 0.55 is the prediction score.

In one embodiment, the creative model training module 210 trains the creative models using one or more machine learning algorithms such as neural networks, naïve Bayes, and support vector machines with the training data stored in the training data store 245. The training data store 245 stores various data for the creative model training module 210 to train the creative models. Examples of the training data include statistics of past advertisement campaigns, such as the click-through rate (CTR) or impression rate, of previously presented creatives or content items of assembled creatives. The training data store 245 also stores training data describing user information of various types of target audiences, e.g., age, gender, demographic group, socioeconomic status.

In one embodiment, the different creative models are trained based on the user information. For example, responding to training samples showing that the male, 18-25 year old group more preferably interact with image creatives involving sports cars as opposed to other types of cars, the creative model training module 210 trains an image creative model that generates a higher prediction score for an image creative showing a sports car than for an image creative of a minivan for a male user of the same age group.

In one embodiment, the different creative models are trained for different target audiences based on user actions committed by the user of the online system 130. For example, a user may have numerous positive posts about victories by the Golden State Warriors on his/her user profile, and the online system 130 stores edges between the user and the Golden State Warriors. The creative model training module 210 trains various creative models to generate higher prediction scores for creatives related to the Golden State Warriors. At run time, the online system 130 receives an image creative from the content provider system 140 that depicts an image of the Warriors logo. The creative feature extraction module 205 may extract an image feature that is related to the Warriors. The image creative of the Warriors logo is scored highly for the user by an image model trained by the creative model training module 210.

The creative analysis module 220 retrieves the extracted features of the individual creatives of a content item from the creative feature store 240 and user features of a target user of the content item from a user feature store or the user profile and maps each feature to a feature value. In one embodiment, the creative analysis module 220 organizes the creative features and the user features as an array (also called "feature vector"). Each feature has an identification and a feature name, e.g., {Feature1: age}. An example feature vector for an image creative described by its width and height and a targeting audience defined by its age and gender is as follows:

```
{
Feature1: age
Feature2: gender
Feature 3: image width
Feature 4: image height
}
```

Although this example feature vector depicts 4 different features (2 from the user, 2 from the image creative), one skilled in the art can appreciate that in other examples, there may be thousands of additional features associated with the user and the image creative that may be included.

The creative analysis module 220 maps each feature in the feature vector associated with a content item to a feature value based on the target user information and creative information of the content item. Each feature value has a predefined value range. For example, gender can be represented by either 1 (for male) or 0 (for female). For a color image in RGB (red-green-blue) color space and each color pixel being represented by 8 bits, a feature representing the color image's more frequent pixel value for its red, green or blue component has a feature value between 1-255. Taking the feature vector of an image creative described by its width (640 pixels) and height (480 pixels) and a targeting audience defined by his age (29 years old) and gender (male represented by 1), the creative analysis module 220 transforms the feature vector into an array of feature values such as [29, 1, 640, 480]. The creative analysis module 220 stores the feature vector and its corresponding array of feature values, each of which corresponds to a feature in the feature vector, in the creative feature store 240.

The creative ranking module 225 ranks each creative candidate to be included in a content item. In one embodiment, the creative ranking module 225 applies a trained creative model to each creative candidate of the corresponding type. For example, the creative ranking module 225 applies a trained image creative model to each image creative candidate and generates a prediction score for the image creative candidate for a given target user. Similarly, the creative ranking module 225 applies a trained title creative model to each title creative candidate and generates a prediction score for the title creative candidate for a given target user. Using the prediction scores, the creative ranking module 225 ranks the creative candidates for each creative type and selects an optimal creative having the highest prediction score among all creative candidates of the same type. For example, assume that the content provider system 140 provides to the online system 130 two images, ImageA and ImageB, and three titles, TitleA, TitleB, and TitleC, to be considered for a content item for a target user, User. The creative ranking module 225 applies an image creative model, e.g., ImageModel, to each of the two images and generates a prediction score for each image. Similarly, the creative ranking module 225 applies a title creative model, e.g., TitleModel, to each of the three titles and generates a prediction score for each title. Based on the prediction scores, the creative ranking module 225 selects an image having the highest prediction score from the two image creative candidates and a title having the highest prediction score among the three title creative candidates. An example pseudocode for the operations of the creative ranking module 225 using the above example is as follows:

```
{
ImageModel (ImageA, User) = 0.50;
ImageModel (ImageB, User) = 0.55;   //ImageB will be selected for User.
TitleModel (TitleA, User) = 0.30;
TitleModel (TitleB, User) = 0.35;
TitleModel (TitleC, User) = 0.40;   //TitleC will be selected for User.
}
```

The creative assembly module 230 retrieves the selected optimal creatives of the content item, where each selected creative has the highest prediction score among multiple creatives of the same creative type for a target user, and fully assembles the creative into a DCO content item to be shown to the target user. The creative assembly module 230 assembles a DCO content item composed of different combinations of the creatives associated with a content item for each different target user. The creative assembly module 230 provides the DCO content item for a target user to other modules (not shown) such as content bidding module of the online system 130 for further processing. In response to a request for content items for the target user, the content bidding module of the online system 130 evaluates all the content item candidates including the DCO content item for the target user based on a variety of evaluation factors (e.g., age of each content item, whether the content item has previously been shown) and selects the best content item for the target user at that particular moment.

In some embodiments, the creative assembly module 230 further calculates a creative score that reflects the effectiveness of the fully assembled DCO content item. In one embodiment, the creative score may simply be an average prediction score based on the prediction scores of the individual creatives included in the DCO content item. In some embodiments, the creative score of the DCO content item is a weighted average of the prediction score of the individual creatives in the DCO content item, where each creative's prediction score may be weighed differently depending on the type of the creative. In one embodiment, the weighing may be determined based on the population group that the DCO content item is targeted for. In some embodiments, the creative score of the DCO content item is calculated based on the past number of clicks on the DCO content item by its target user over a period of time.

In some embodiments, the creative assembly module 230 assembles the creatives of a content item while taking into consideration applicable rules or constraints associated with the content item. The rules are provided by the content provider, where the rules describe how the creatives of the content item should be assembled into a DCO content item. In one embodiment, the creative rule module 235 receives the rules associated with the content item from the content providers and stores the received rules in the creative rule store 250. The creative rule module 235 selects applicable rules for assembling the creatives of the content item and provides the selected rules to the creative assembly module 230.

In one embodiment, each rule for creating a DCO content item includes a condition, an operator and a type of action to be performed on one or more creatives. Condition parameter defines when an action and what type of an action should be applied to one or more creatives to be included in the DCO content item. Examples of condition include: Boolean, string, int (representing an integer value); examples of operator include: not equal, equal, bigger than, smaller than, logic "AND" and logic "OR." Example actions that can be applied to creatives include: group, mutex, promote, demote and template.

Assembling Creatives Using Dynamic Creative Optimization

Figure 4:
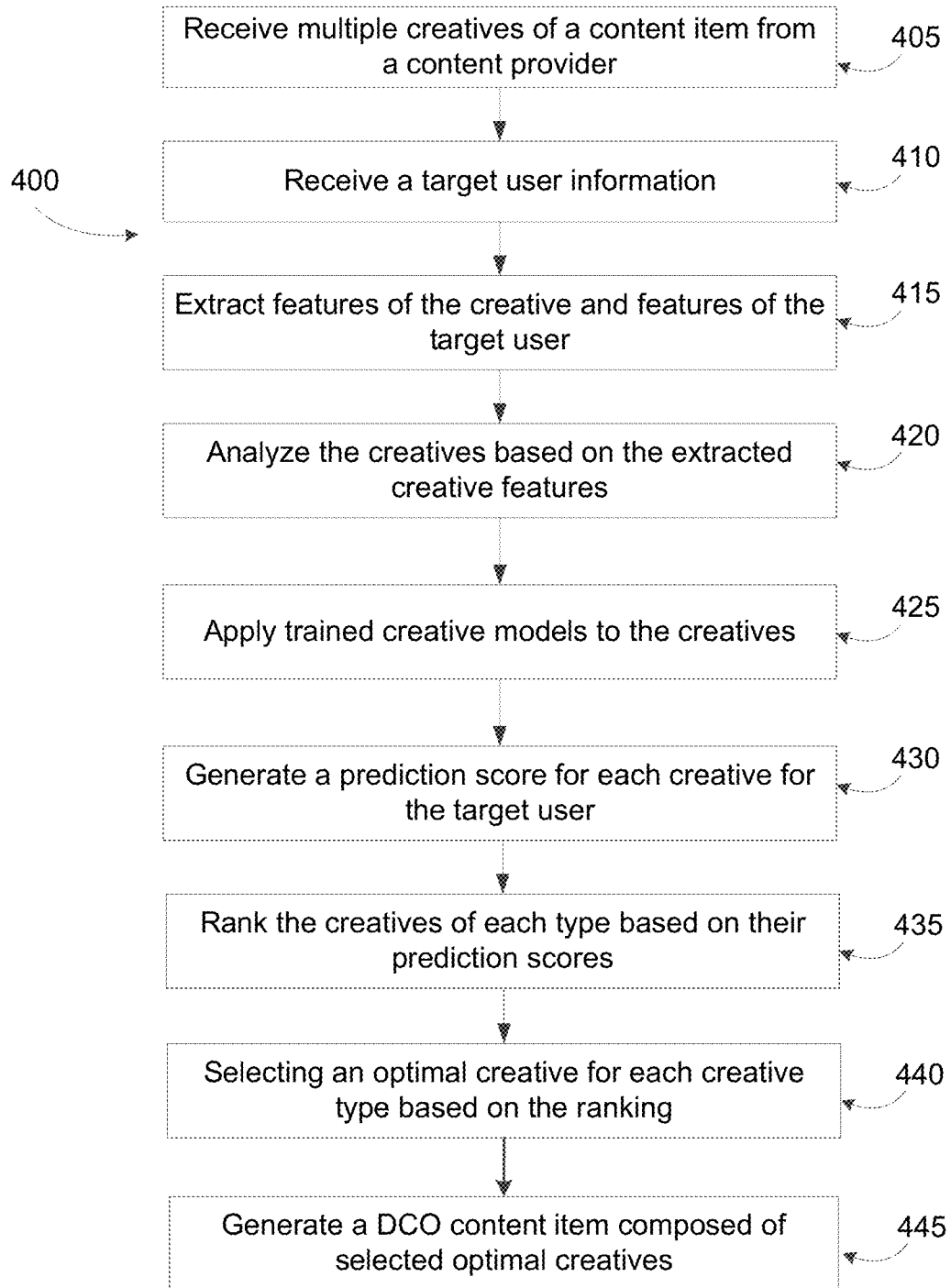
FIG. 4 is a flowchart of assembling a sponsored content using dynamic creative optimization in accordance with one embodiment of the invention.

FIG. 4 shows a flowchart of a process 400 for assembling a content item for a target user using dynamic creative optimization, in accordance with one embodiment of the invention. Initially, the DCO module 200 receives 405 multiple creatives of a content item from a content provider 140. The DCO module 200 also receives 410 information describing a target user. The DCO module 200 extracts 415 the creative features associated with each creative. For example, if the creative is an image creative, features such as the prominent and background colors present in the image creative are extracted from the image creative. The extracted features of each individual creative are stored in the creative feature store 240. The DCO module 200 also extracts user features describing the target user, e.g., gender, age, demographic information, personal interests and any other related features from the user information.

The DCO module 200 analyzes 420 the creative features, e.g., adding an extracted feature into a feature vector and mapping a feature in the feature vector to a feature value. The DCO module 200 trains one or more creative models using various training data retrieved from training data store 245. Each creative type has a corresponding creative model, e.g., image creatives having an image model and title creatives having a title model. The DCO module 200 applies 425 a trained creative model to each received creative according to the type of each creative and generates 430 a prediction score, which represents a likelihood that the target user interacts with the DCO content item having the creative being predicted. The DCO module 200 ranks 435 the creatives of the same type, e.g., all image creatives received from the content provider, based on the prediction scores of the creatives. The DCO module 200 selects 440 a creative for each creative type, where each selected creative has the highest prediction score among all the creatives of the same type. The DCO module 200 generates 445 a DCO content item composed of the selected creatives for the target user. A different target user of the content item may receive a DCO content item composed of different creatives selected from the same set of creatives provided by the content provider system 140.

General

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
   receiving, from a content provider, a plurality of creatives to include in a content item presented to a plurality of target users, each creative of the plurality of creatives having a type and a plurality of creative features;
   identifying an opportunity to present the content item to a target user of the plurality of target users, the target user being described by one or more user features;
   for each creative of the plurality of creatives:
      obtaining the plurality of creative features by extracting the plurality of creative features from the creative;
      analyzing the extracted plurality of creative features and one or more user features of the target user;
      applying a trained creative model to the creative based on the analyzed plurality of creative features associated with the creative and the analyzed one or more user features of the target user, wherein the model is trained on user characteristics accessed from social networking system user profiles of the plurality of target users; and
      generating a prediction score for the creative based on the application of the trained creative model, wherein the prediction score reflects how likely the target user is to interact with a content item that includes the creative;
   ranking a subset of creatives of the plurality of creatives based on the prediction scores of the creatives in the subset, each creative in the subset of creatives having a same type;
   selecting an optimal creative for each type of creative based on the ranking;
   accessing one or more content assembly rules based on the selected optimal creative for each type of creative; and
   assembling the content item for the target user by combining an image associated with the content item with one or more of the selected optimal creatives according to the one or more accessed content assembly rules, the image displayed in proximity to one or more of the selected optimal creatives when the content item is displayed within an interface of the content provider.

2. The method of claim 1, wherein the type of a creative comprises one of image, video, title, body, call_for_action-_type, universal resource link (URL), description and caption.

3. The method of claim 1, wherein analyzing the extracted plurality of creative features and the one or more user features comprises:
   storing the plurality of creative features and the one or more user features in a feature vector, each feature in the feature vector having an identification; and
   mapping each feature in the feature vector to a feature value.

4. The method of claim 1, further comprising:
   training at least one creative model for each type of creative of the plurality of creatives based on a corpus of training data, the training data including the user characteristics accessed from social networking system user profiles; and
   applying a trained creative model to each creative, each creative having the type that matches the type of creative the trained creative model was trained on.

5. The method of claim 1, further comprising:
   applying a plurality of rules associated with the content item, each rule of the plurality of rules describing a condition and an operation on one or more creatives of the plurality of creatives responsive to the condition being met;
   selecting the creatives based on the application of the plurality of rules; and
   creating the content item based on the selection of the creatives.

6. The method of claim 1, wherein selecting an optimal creative for each type of creative based on the ranking comprises:
   selecting a creative having the highest prediction score among two or more creatives of the same type.

7. The method of claim 1, further comprising:
   presenting the assembled content item to the target user; and
   monitoring target user interactions with the content item.

8. The method of claim 7, further comprising:
   calculating a creative score for the assembled content item based on the monitored target user interactions.

9. The computer implemented method of claim 1, wherein the trained creative model is trained on user characteristics using one of: neural networks, naïve Bayes classifiers, and support vector machines.

10. The computer implemented method of claim 1, wherein the trained creative model is trained on data comprising one of: previously presented creatives, content items comprised of assembled creatives, and user interactions with content items of assembled creatives.

11. A non-transitory computer-readable medium comprising computer program instructions, the computer program instructions when executed by a processor of a computer device causes the processor to perform the steps including:
   receiving, from a content provider, a plurality of creatives to include in a content item presented to a target user, each creative of the plurality of creatives having a type and a plurality of creative features;
   identifying an opportunity to present a content item to the target user, the target user being described by one or more user features;
   for each creative of the plurality of creatives:
      obtaining the plurality of creative features by extracting the plurality of creative features from the creative;
      analyzing the extracted plurality of creative features and one or more user features of the target user;
      applying a trained creative model to the creative based on the analyzed plurality of creative features associated with the creative and the analyzed one or more user features of the target user, wherein the model is trained on user characteristics accessed from social networking system user profiles of the plurality of target users; and
      generating a prediction score for the creative based on the application of the trained creative model, wherein the prediction score reflects how likely the target user is to interact with a content item that includes the creative;
   ranking a subset of creatives of the plurality of creatives based on the prediction scores of the creatives in the subset, each creative in the subset of creatives having a same type;
   selecting an optimal creative for each type of creative based on the ranking;
   accessing one or more content assembly rules based on the selected optimal creative for each type of creative; and
   assembling the content item for the target user by combining an image associated with the content item with one or more of the selected optimal creatives according to the one or more accessed content assembly rules, the image displayed in proximity to one or more of the selected optimal creatives when the content item is displayed within an interface of the content provider.

12. The non-transitory computer-readable storage medium of claim 11, wherein the type of a creative comprises one of image, video, title, body, call_for_action_type, universal resource link (URL), description and caption.

13. The non-transitory computer-readable storage medium of claim 11, wherein analyzing the extracted plurality of creative features and the one or more user features comprises:
   storing the plurality of creative features and the one or more user features in a feature vector, each feature in the feature vector having an identification; and
   mapping each feature in the feature vector to a feature value.

14. The non-transitory computer-readable storage medium of claim 11, further comprising computer program instructions for:
   training at least one creative model for each type of creative of the plurality of creatives based on a corpus of training data, the training data including the user characteristics accessed from social networking system user profiles; and
   applying a trained creative model to each creative, each creative having the type that matches the type of creative the trained creative model was trained on.

15. The non-transitory computer-readable storage medium of claim 11, further comprising computer program instructions for:
   applying a plurality of rules associated with the content item, each rule of the plurality of rules describing a condition and an operation on one or more creatives of the plurality of creatives responsive to the condition being met;
   selecting the creatives based on the application of the plurality of rules; and
   creating the content item based on the selection of the creatives.

16. The non-transitory computer-readable storage medium of claim 11, wherein selecting an optimal creative for each type of creative based on ranking comprises:
   selecting a creative having the highest prediction score among two or more creatives of the same type.

17. The non-transitory computer-readable storage medium of claim 11, further comprising computer program instructions for:
   presenting the assembled content item to the target user; and
   monitoring target user interactions with the content item.

18. The non-transitory computer-readable storage medium of claim 17, further comprising computer program instructions for:
   calculating a creative score for the assembled content item based on the monitored target user interactions;
   content item based on the monitored target user interactions.

* * * * *